United States Patent
Ziech et al.

(10) Patent No.: US 9,556,941 B2
(45) Date of Patent: Jan. 31, 2017

(54) TRANSMISSION HAVING A CONTINUOUSLY OR INFINITELY VARIABLE VARIATOR DRIVE

(71) Applicant: Dana Limited, Maumee, OH (US)

(72) Inventors: James F. Ziech, Kalamazoo, MI (US); Kenneth E. Cooper, Toledo, OH (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 14/425,598

(22) PCT Filed: Sep. 3, 2013

(86) PCT No.: PCT/US2013/057866
§ 371 (c)(1),
(2) Date: Mar. 3, 2015

(87) PCT Pub. No.: WO2014/039447
PCT Pub. Date: Mar. 13, 2014

(65) Prior Publication Data
US 2015/0226294 A1 Aug. 13, 2015

Related U.S. Application Data

(60) Provisional application No. 61/697,378, filed on Sep. 6, 2012, provisional application No. 61/780,634, filed on Mar. 13, 2013.

(51) Int. Cl.
*F16H 37/02* (2006.01)
*F16H 15/52* (2006.01)

(52) U.S. Cl.
CPC ............ *F16H 37/022* (2013.01); *F16H 15/52* (2013.01); *F16H 37/02* (2013.01);
(Continued)

(58) Field of Classification Search
CPC ..... F16H 37/022; F16H 15/52; F16H 2037/026
See application file for complete search history.

(56) References Cited

U.S. PATENT DOCUMENTS

| 1,063,244 A | 6/1913 | Ludwig |
| 1,215,969 A | 2/1917 | Thomas |

(Continued)

FOREIGN PATENT DOCUMENTS

| AU | 2011224083 A1 | 10/2011 |
| CN | 101392825 A | 3/2009 |

(Continued)

OTHER PUBLICATIONS

Co-pending U.S. Appl. No. 14/925,813, filed Oct. 28, 2015.
(Continued)

*Primary Examiner* — Sherry Estremsky
(74) *Attorney, Agent, or Firm* — Marshall & Melhorn, LLC (57) ABSTRACT

A transmission having a variator drive capable of being placed in a continuously variable operating mode or an infinitely variable operating mode, capable of having a wide ratio range, and capable of transmitting large amounts of power. Variable transmissions comprising three clutches, three grounding clutches or brakes, and a variator comprising a plurality of tilting variators balls disposed between a first drive ring and a second drive ring allow a single variator to function as an infinitely variable transmission when power is inputted to the carrier assembly and as a continuously variable transmission when power is inputted through a first ring assembly. Certain embodiments include a differential that allows a parallel power path around the variator to improve the variator torque capacity and a direct drive mode to improve the efficiency of the variator.

20 Claims, 4 Drawing Sheets

(52) U.S. Cl.
CPC ............... F16H 2037/026 (2013.01); F16H 2200/2005 (2013.01); F16H 2200/2046 (2013.01)

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Phillip et al. |
| 3,505,718 A | 4/1970 | Carl |
| 3,583,060 A | 6/1971 | Maurice |
| 3,688,600 A | 9/1972 | Allan |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |

(56) References Cited

U.S. PATENT DOCUMENTS

| | | |
|---|---|---|
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,114,799 B2 | 8/2015 | Tsukamoto et al. |
| 9,156,463 B2 | 10/2015 | Legner |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111693 A1 | 4/2015 | Wang et al. |
| 2015/0198246 A1 | 7/2015 | Callaway et al. |
| 2015/0204429 A1 | 7/2015 | Versteyhe |
| 2015/0204430 A1 | 7/2015 | Versteyhe |
| 2015/0226298 A1 | 8/2015 | Versteyhe |
| 2015/0226299 A1 | 8/2015 | Cooper |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0109001 A1* | 4/2016 | Schoolcraft ............ F16H 37/022 475/214 |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0281828 A1 | 9/2016 | Haka |
| 2016/0290458 A1 | 10/2016 | Taskiran et al. |

FOREIGN PATENT DOCUMENTS

| | | |
|---|---|---|
| CN | 101479503 A | 7/2009 |
| CN | 101617146 A | 12/2009 |
| CN | 102297255 A | 12/2011 |
| CN | 102338208 A | 2/2012 |
| CN | 202165536 U | 3/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2006109158 A1 | 10/2006 |
| WO | WO-2007046722 A1 | 4/2007 |
| WO | WO-2007051827 A1 | 5/2007 |
| WO | WO-2008101070 A2 | 8/2008 |
| WO | WO-2008103543 A1 | 8/2008 |
| WO | WO-2011011991 A1 | 2/2011 |
| WO | WO-2012008884 A1 | 1/2012 |

(56) References Cited

FOREIGN PATENT DOCUMENTS

| | | |
|---|---|---|
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

PCT/US2014/025001 International Preliminary Report on Patentability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2014/065909 Written Opinion dated Dec. 11, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
PCT/US2013/021890 International Preliminary Report on Patentability dated Jul. 31, 2014.
PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
PCT/US2014/015352 International Search Report and Written Opinion dated May 27, 2014.
U.S. Appl. No. 13/743,951 Office Action dated Aug. 19, 2015.
U.S. Appl. No. 14/175,584 Office Action dated Apr. 2, 2015.
U.S. Appl. No. 60/616,399, filed Oct. 5, 2004.
Co-pending U.S. Appl. No. 14/542,336, filed Nov. 14, 2014.
Co-pending U.S. Appl. No. 14/546,603, filed Nov. 18, 2014.
Co-pending U.S. Appl. No. 14/622,038, filed Feb. 13, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Search Report and Written Opinion dated Mar. 31, 2014.
PCT/US2013/057838 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065909 International Search Report and Written Opinion dated Feb. 19, 2015.
PCT/US2014/25001 International Search Report and Written Opinion dated Jul. 14, 2014.
PCT/US2014/25004 International Search Report and Written Opinion dated Jul. 14, 2014.
PCT/US2014/25005 International Search Report and Written Opinion dated Jul. 14, 2014.
PCT/US2014/26619 International Search Report and Written Opinion dated Sep. 9, 2014.
PCT/US2014/65796 International Search Report and Written Opinion dated Apr. 9, 2015.
PCT/US2014/65792 International Search Report and Written Opinion dated Apr. 9, 2015.
U.S. Appl. No. 13/743,951 Office Action dated Mar. 18, 2015.
Provisional U.S. Appl. No. 61/819,414, filed May 3, 2013.

(56) References Cited

OTHER PUBLICATIONS

U.S. Appl. No. 14/017,054 Office Action dated Aug. 27, 2014.
U.S. Appl. No. 14/017,054 Office Action dated Dec. 12, 2014.
Wong. The Temple of VTEC Asia Special Focus on the Multimatic Transmission. Temple of VTEC Asia. 2000.
PCT/US2014/041124 International Preliminary Report on Patentability dated Dec. 17, 2015.
PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
Co-pending U.S. Appl. No. 15/209,487, filed Jul. 13, 2016.
Co-pending U.S. Appl. No. 15/215,179, filed Jul. 20, 2016.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
PCT/US2016/29853 International Search Report and Written Opinion dated Aug. 8, 2016.
U.S. Appl. No. 14/334,538 Office Action dated Jul. 29, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
Co-pending U.S. Appl. No. 15/067,427, filed Mar. 11, 2016.
Co-pending U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.
PCT/US2016/045857 International Search Report and Written Opinion dated Oct. 13, 2016.

* cited by examiner

FIG. 1

| Operating Mode | First Clutch 8 | Second Clutch 10 | Third Clutch 12 | First Grounding Clutch 28 | Second Grounding Clutch 30 | Third Grounding Clutch 46 |
|---|---|---|---|---|---|---|
| Continuously Variable Overdrive | Engaged | Disengaged | Disengaged | Disengaged | Engaged | Engaged |
| Continuously Variable | Engaged | Disengaged | Engaged | Disengaged | Engaged | Disengaged |
| Forward Infinitely Variable | Disengaged | Engaged | Engaged | Engaged | Disengaged | Disengaged |
| Reverse Infinitely Variable | Disengaged | Engaged | Engaged | Engaged | Disengaged | Disengaged |

| Operating Mode | First Clutch 8 | Second Clutch 10 | Third Clutch 12 | First Grounding Clutch 28 | Second Grounding Clutch 30 | Third Grounding Clutch 46 |
|---|---|---|---|---|---|---|
| Continuously Variable Overdrive | Engaged | Disengaged | Disengaged | Disengaged | Engaged | Engaged |
| Continuously Variable | Engaged | Disengaged | Engaged | Disengaged | Engaged | Disengaged |
| Forward Infinitely Variable | Disengaged | Engaged | Engaged | Engaged | Disengaged | Disengaged |
| Reverse Infinitely Variable | Disengaged | Engaged | Engaged | Engaged | Disengaged | Disengaged |
| Direct Drive | Engaged | Disengaged | Disengaged | Engaged | Disengaged | Disengaged |

FIG. 4

TRANSMISSION HAVING A CONTINUOUSLY OR INFINITELY VARIABLE VARIATOR DRIVE

CROSS-REFERENCE

This application is filed pursuant to 35 U.S.C. §371 as a United States National Phase Application of International Application No. PCT/US2013/057866, filed Sep. 3, 2013, which application claims the benefit of U.S. Provisional Application No. 61/697,378, filed Sep. 6, 2012, and U.S. Provisional Application No. 61/780,634, filed Mar. 13, 2013, which are incorporated herein by reference in their entirety.

BACKGROUND OF THE INVENTION

A vehicle having a driveline including a continuously variable transmission allows an operator of the vehicle or a control system of the vehicle to vary a drive ratio in a stepless manner, permitting a power source of the vehicle to operate at its most efficient rotational speed. Further, the continuously variable transmission may be configured to be an infinitely variable transmission, wherein the vehicle can be steplessly shifted from a forward mode to a neutral mode or even to a reverse mode. Continuously variable transmissions known in the art tend to have limited ratio ranges and are typically limited to transmitting smaller amounts of power.

SUMMARY OF THE INVENTION

Provided herein is a variable transmission comprising three clutches, three grounding clutches (alternatively called a brake or brake to ground, and having the characteristics thereof), and a variator comprising a plurality of tilting variators balls disposed between a first drive ring (or a first ring assembly) and a second drive ring (or a second ring assembly). This transmission configuration expand the ratio range and increase the power capacity of the variator for commercial vehicle applications. The three clutches and three brakes (alternatively called grounding clutches herein) allow a single variator to function as an infinitely variable transmission when power is inputted to the carrier assembly and as a continuously variable transmission when power is inputted through a first ring assembly (which may also and/or alternatively be called an input ring). Certain embodiments additionally include a differential, such as a bevel gear differential, which allows a parallel power path around the variator to improve the variator torque capacity. These embodiments which comprise the differential also have a direct drive mode to improve the efficiency of the variator.

Provided herein is a variable transmission comprising an input shaft; a first ring assembly rotatably disposed in a housing selectively drivingly engaged with the input shaft using a first clutch, the first ring assembly configured to be prevented from rotating relative to the housing by a first grounding clutch and the first ring assembly comprising a first variator ball engagement surface that is in driving engagement with a plurality of variator balls. The variable transmission may further comprise a carrier assembly rotatably disposed in the housing and selectively drivingly engaged with the input shaft using a second clutch, the carrier assembly comprising an annular arrangement of the plurality of tiltable variator balls each having ball axle shafts, and configured to be prevented from rotating relative to the housing by a second grounding clutch. The variable transmission may further comprise a second ring assembly rotatably disposed in the housing selectively drivingly engaged with the output shaft using a third clutch or one or more gears of a planetary gearset rotatably disposed on the second ring assembly, the second ring assembly comprising a second variator ball engagement surface that is in driving engagement with each of the variator balls The variable transmission may further comprise a third grounding clutch that engages the one or more gears of the planetary gearset. The variable transmission may further comprise an output shaft comprising a sun gear that is selectively drivingly engaged with the one or more output gears of the planetary gearset using the third grounding clutch. The variable transmission of such configurations may have a forward infinitely variable operating mode, a reverse infinitely variable operating mode, and a continuously variable operating mode, and a continuously variable overdrive operating mode.

In some embodiments, a middle portion of the input shaft is selectively drivingly engaged with the first ring assembly.

In some embodiments, the forward infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the reverse infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the continuously variable operating mode exists when the first clutch is engaged, the second clutch is disengaged, the third clutch is engaged, the first grounding clutch is disengaged, the second grounding clutch is engaged, and the third grounding clutch is disengaged.

In some embodiments, the continuously variable overdrive operating mode exists when the first clutch is engaged, the second clutch is disengaged, the third clutch is disengaged, the first grounding clutch is disengaged, the second grounding clutch is engaged, and the third grounding clutch is engaged.

Provided herein is a variable transmission comprising an input shaft and a differential rotatably disposed in a housing and drivingly engaged with the input shaft, the differential comprising a differential spider and a plurality of bevel gears rotatably disposed thereon. The variable transmission may further comprise a first drive member rotatably disposed about the input shaft and in driving engagement with the differential. The variable transmission may further comprise a first ring assembly rotatably disposed in the housing selectively drivingly engaged with the first drive member using a first clutch, the first ring assembly configured to be prevented from rotating relative to the housing by a first grounding clutch and the first ring assembly comprising a first variator ball engagement surface that is in driving engagement with a plurality of variator balls. The variable transmission may further comprise a carrier assembly rotatably disposed in the housing and selectively drivingly engaged with the first drive member using a second clutch, the carrier assembly comprising an annular arrangement of the plurality of tiltable variator balls each having ball axle shafts, and configured to be prevented from rotating relative to the housing by a second grounding clutch. The variable transmission may further comprise a second ring assembly rotatably disposed in the housing selectively drivingly engaged with the output shaft using a third clutch or one or more gears of a planetary gearset rotatably disposed on the second ring assembly, wherein one or more gears of the planetary gearset are configured to be prevented from rotating relative to the housing using a third grounding clutch, the second ring assembly comprising a second variator ball engagement surface that is in driving engagement with each of the variator balls. The variable transmission may further comprise an output shaft drivingly engaged with the differential and comprising a sun gear that is selectively drivingly engaged with one or more output gears of the planetary gearset using the third grounding clutch. The variable transmission of such configurations may have a forward infinitely variable operating mode, a reverse infinitely variable operating mode, and a continuously variable operating mode, a continuously variable overdrive operating mode, and a direct drive mode.

In some embodiments, the bevel gears apply torque to the first drive member and the output shaft when the input shaft is rotated. In some embodiments, the differential comprises a side gear drivingly engaged with the first drive member, and a second side gear drivingly engaged with the output shaft. In some embodiments, the differential is rotatably supported within the housing. In some embodiments, the differential in driving engagement with the with the first drive member and the output shaft results in a reduction of an overall ratio spread of the variable transmission and reduces an amount of torque applied to the carrier assembly as compared to the embodiment of FIG. 1, for example, or as compared to other embodiments not including a bevel gear, since the bevel gear (alternatively called a bevel differential, or a bevel gear splitter) splits the torque in half through the variator and half directly to the output shaft.

In some embodiments, the first drive member is an annular body. In some embodiments, the first drive member is drivingly engaged with a first side gear of the differential. In some embodiments, a middle portion of the first drive member is selectively drivingly engaged with the carrier assembly. In some embodiments, a second end of the first drive member is selectively drivingly engaged with the first ring assembly.

In some embodiments, the variator balls and the first engagement portion are driven when the input shaft is rotated and the first clutch is engaged.

In some embodiments, the forward infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the reverse infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the continuously variable operating mode exists when the first clutch is engaged, the second clutch is disengaged, the third clutch is engaged, the first grounding clutch is disengaged, the second grounding clutch is engaged, and the third grounding clutch is disengaged.

In some embodiments, the continuously variable overdrive operating mode exists when the first clutch is engaged, the second clutch is disengaged, the third clutch is disengaged, the first grounding clutch is disengaged, the second grounding clutch is engaged, and the third grounding clutch is engaged.

In some embodiments, the direct drive operating mode exists when the first clutch is engaged, the second clutch is disengaged, the third clutch is disengaged, the first grounding clutch is engaged, the second grounding clutch is disengaged, and the third grounding clutch is disengaged.

In some embodiments, the input shaft and the output shaft are at least partially disposed in the housing.

In some embodiments, the variable transmission comprises an axial force generator configured to generate sufficient axial force to properly operate the vehicle transmission. In some embodiments, the axial force generator comprises one or more clamping mechanisms. In some embodiments, the axial force generator comprises a ball ramp. In some embodiments, the axial force generator comprises a ball ramp thrust ring. In some embodiments, the axial force generator comprises a load applied during assembly of the variable transmission.

In some embodiments, the input shaft is drivingly engaged with a torsional dampener disposed between an engine and the variable transmission.

In some embodiments, the first clutch comprises a wet plate clutch, a dry plate clutch, a cone clutch, or any other clutch type that may be variably engaged. In some embodiments, the second clutch comprises a wet plate clutch, a dry plate clutch, a cone clutch, or any other clutch type that may be variably engaged. In some embodiments, the third clutch comprises a wet plate clutch, a dry plate clutch, a cone clutch, or any other clutch type that may be variably engaged.

In some embodiments, each of the ball axle shafts is adjusted using a cam style tilting mechanism. In some embodiments, each of the ball axle shafts is adjusted using a split carrier axle skewing mechanism.

In some embodiments, the first ring assembly comprises a first clutch engagement portion. In some embodiments, the first clutch engagement portion extends inwardly from an inner surface of the first ring assembly.

In some embodiments, the second ring assembly comprises a third clutch engagement portion. In some embodiments, the third clutch engagement portion extends inwardly from an inner surface of the second ring assembly.

In some embodiments, the first variator ball engagement surface is formed in a distal end of the first ring assembly. In some embodiments, the first variator ball engagement surface is formed in an input ring of the first ring assembly. In some embodiments, the first variator ball engagement surface is a conical surface or a concave toroidal surface in contact with or slightly spaced apart from each of the variator balls.

In some embodiments, the second variator ball engagement surface is a conical surface or a concave toroidal surface in contact with or slightly spaced apart from each of the variator balls. In some embodiments, the first variator ball engagement surface is in driving engagement with each of the variator balls of the carrier assembly through one of a boundary layer type friction and an elastohydrodynamic film. In some embodiments, the second variator ball engagement surface is in driving engagement with each of the variator balls of the first carrier assembly through one of a boundary layer type friction and an elastohydrodynamic film.

In some embodiments, the planetary gearset comprises a plurality of planet output gears. In some embodiments, the third grounding clutch is at least partially disposed on an inner surface of the housing. In some embodiments, the planetary gearset comprises a ring gear comprising a third grounding clutch engagement portion. In some embodiments, the third grounding clutch engagement portion extends outwardly from an outer surface of the ring gear. In some embodiments, the third grounding clutch engagement portion makes up a portion of the third grounding clutch. In some embodiments, the third grounding clutch is selectively variably engaged to fix the ring gear to the housing. In some embodiments, the ring gear is in driving engagement with at least one planet output gear. In some embodiments, the ring gear is in driving engagement with a plurality of planet output gears. In some embodiments, the ring gear is in driving engagement with a plurality of planet output gears. In some embodiments, engaging the third grounding clutch changes an output ratio between the second ring assembly and the output shaft.

In some embodiments, the output shaft is drivingly engaged with a vehicle output.

In some embodiments, a middle portion of the output shaft is selectively drivingly engaged with the second ring assembly using the third clutch. In some embodiments, the third grounding clutch is configured to change an output ratio between the second ring assembly and the output shaft when said third grounding clutch is engaged.

In some embodiments, a mode of the transmission depends on the engagement status of the first clutch, the second clutch, the third clutch, the first grounding clutch, the second grounding clutch, and the third grounding clutch.

Provided herein is a vehicle driveline comprising the variable transmission of any type or configuration described herein, wherein said variable transmission is disposed between an engine and a vehicle output. In some embodiments, the vehicle output comprises a differential and a drive axle. In some embodiments, the vehicle driveline comprises a torsional dampener disposed between the engine and the variable transmission. In some embodiments, the torsional dampener comprises at least one torsional spring.

Figure 2:
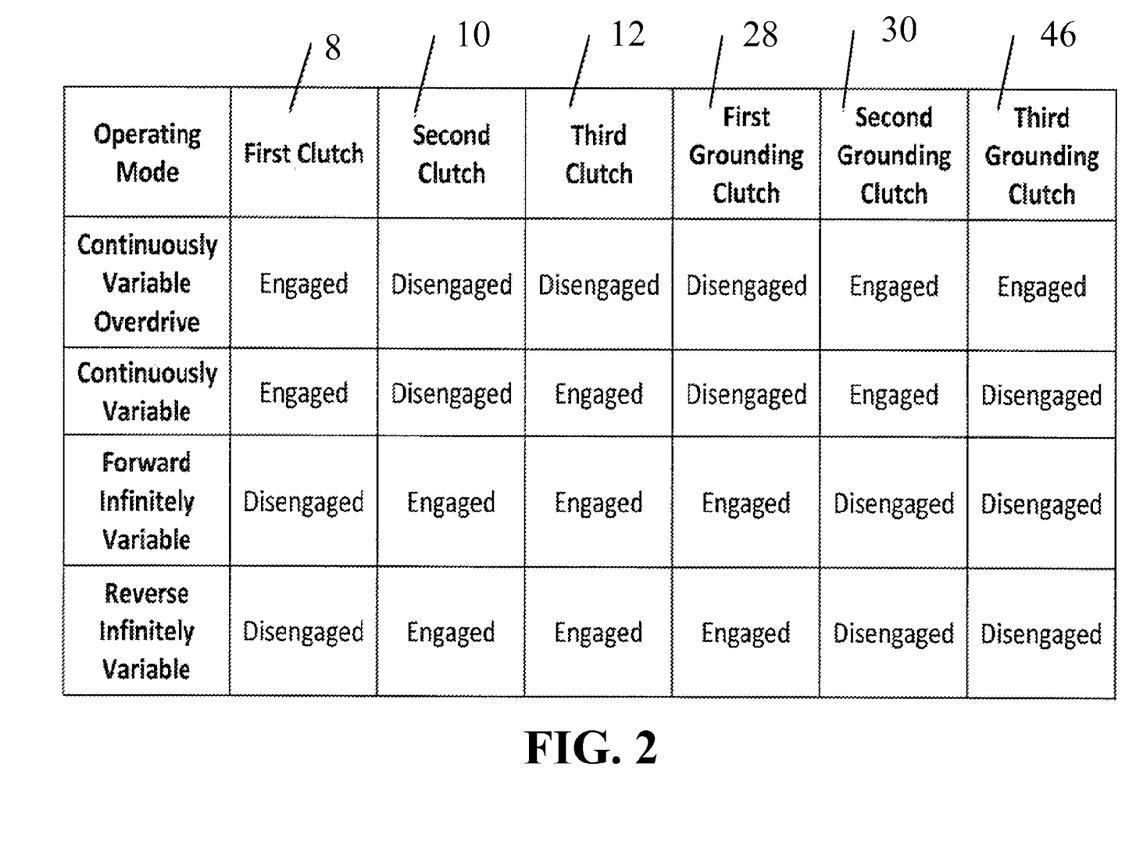
FIG. 2 depicts four of the multiple operating modes of the vehicle transmission embodiment of FIG. 1.

Provided herein is a method of changing from between a continuously variable transmission mode, a continuously variable overdrive transmission mode, and an infinitely variable transmission mode (forward or reverse), comprising engaging or disengaging a first clutch, second clutch, third clutch, first grounding clutch, second grounding clutch, and third grounding clutch of any of variable transmission as described herein without a bevel gear differential therein according to the table in FIG. 2.

Figure 4:
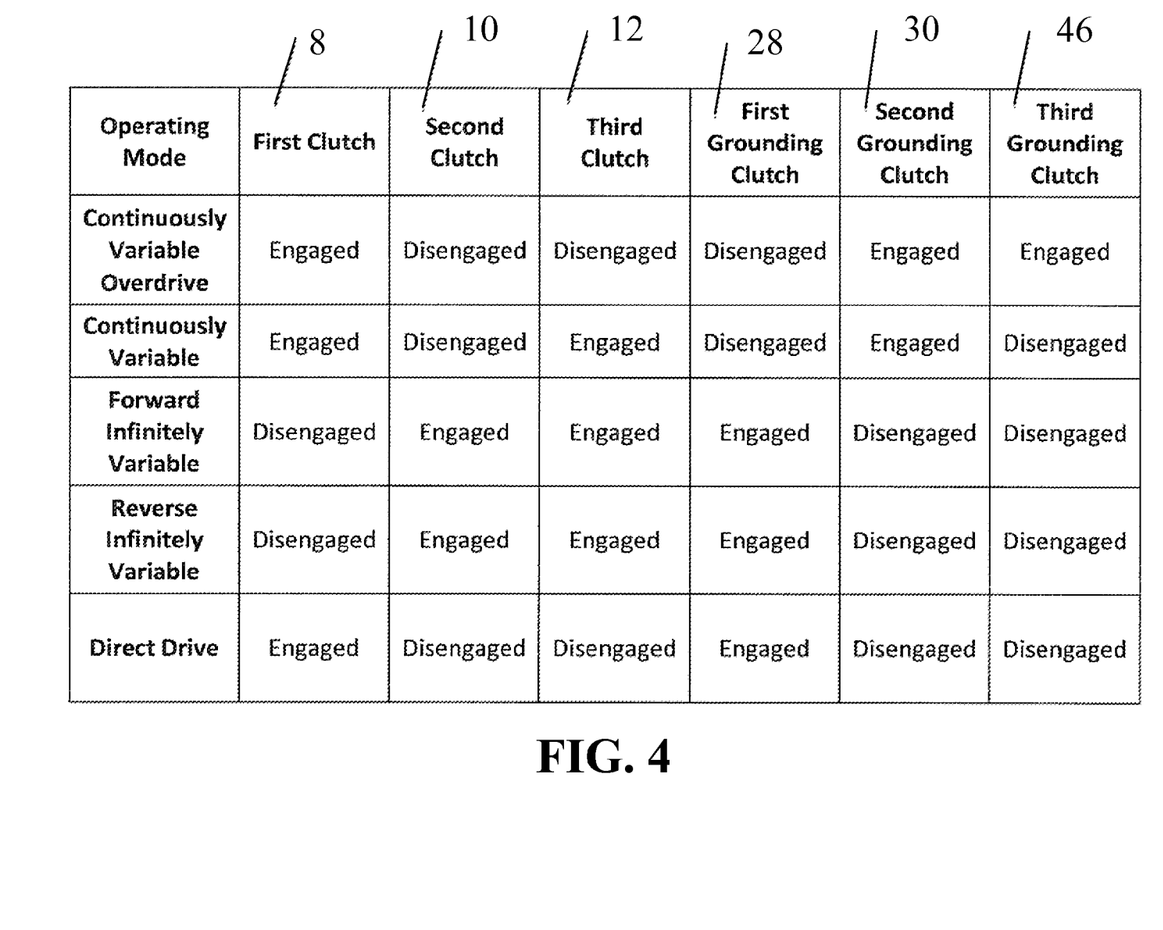
FIG. 4 depicts several of the multiple operating modes of the vehicle transmission embodiment of FIG. 3.

A method of changing from between a continuously variable transmission mode, a continuously overdrive transmission mode, a direct drive transmission mode, and an infinitely variable transmission mode (forward or reverse), comprising engaging or disengaging a first clutch, second clutch, third clutch, first grounding clutch, second grounding clutch, and third grounding clutch of any of variable transmission as described herein including a bevel gear differential therein according to the table in FIG. 4.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided herein is a transmission having a variator drive capable of being placed in a continuously variable operating mode or an infinitely variable operating mode, capable of having a wide ratio range, and capable of transmitting larger amounts of power. Additional variable transmission details are described in US non-prov number of U.S. application Ser. No. 13/743,951 filed Jan. 17, 2013, and/or PCT/US2013/026037 filed Feb. 14, 2013, incorporated herein by reference in their entirety.

Figure 1:
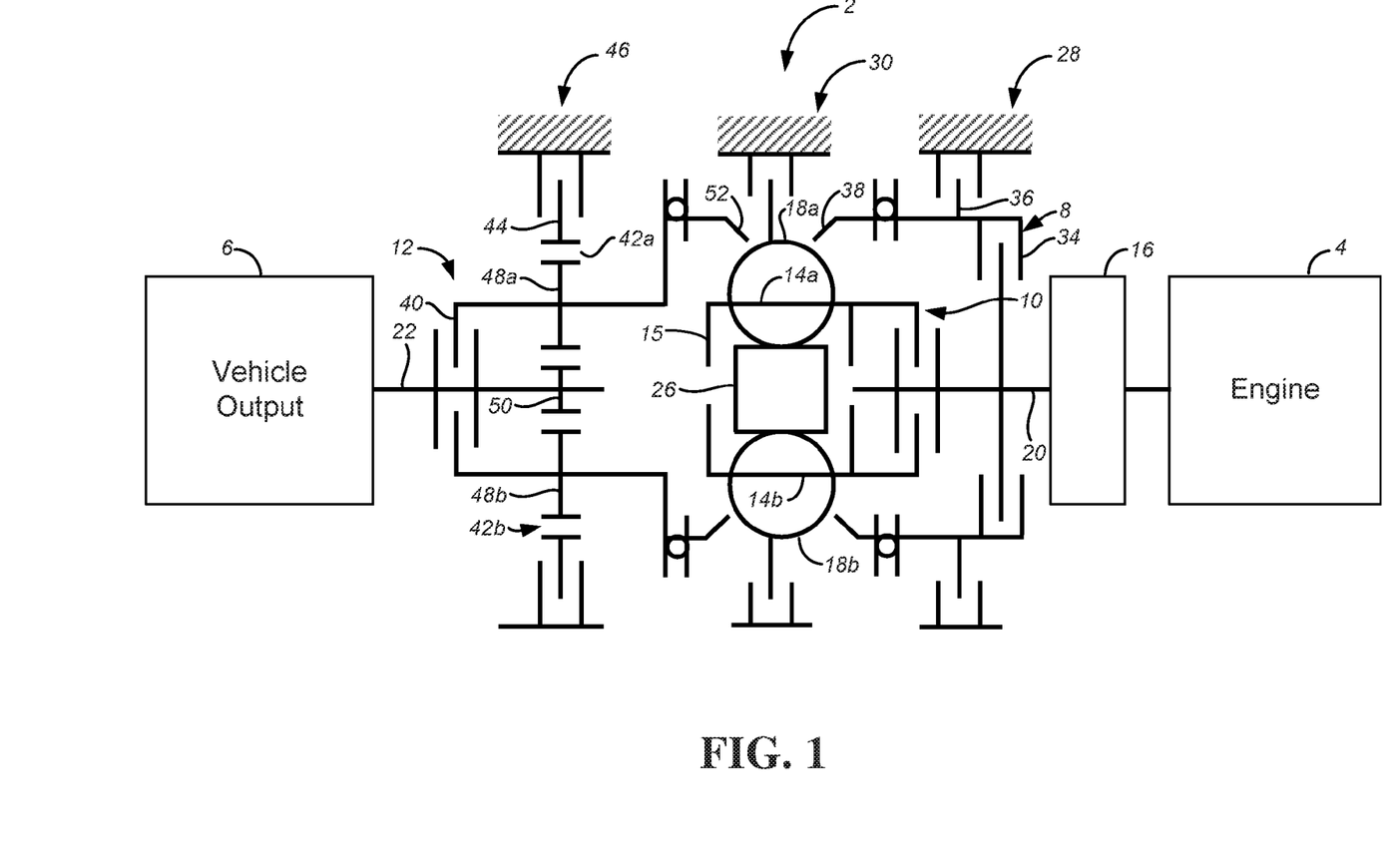
FIG. 1 depicts an embodiment of a vehicle driveline comprising a variable transmission.

In a vehicle, a variable transmission 2 may be used to replace a conventional transmission in a vehicle driveline. The variable transmission 2 is located between an engine 4 and a vehicle output 6 as shown in FIG. 1. The vehicle output 6 may be a drive shaft or a differential, for example. A torsional dampener 16 is also typically disposed between the engine 4 and the variable transmission 2 to reduce vibration and torque peaks.

Provided herein is a variable transmission comprising three clutches, three grounding clutches (alternatively called a brake or brake to ground, and having the characteristics thereof), and a variator comprising a plurality of tilting variators balls disposed between a first drive ring (or a first ring assembly) and a second drive ring (or a second ring assembly). This transmission configuration expand the ratio range and increase the power capacity of the variator for commercial vehicle applications. The three clutches and three brakes (alternatively called grounding clutches herein) allow a single variator to function as an infinitely variable transmission when power is inputted to the carrier assembly and as a continuously variable transmission when power is inputted through a first ring assembly (which may also and/or alternatively be called an input ring). Certain embodiments additionally include a differential, such as a bevel gear differential, which allows a parallel power path around the variator to improve the variator torque capacity. These embodiments which comprise the differential also have a direct drive mode to improve the efficiency of the variator.

Provided herein is a variable transmission comprising an input shaft; a first ring assembly rotatably disposed in a housing selectively drivingly engaged with the input shaft using a first clutch, the first ring assembly configured to be prevented from rotating relative to the housing by a first grounding clutch and the first ring assembly comprising a first variator ball engagement surface that is in driving engagement with a plurality of variator balls. The variable transmission may further comprise a carrier assembly rotatably disposed in the housing and selectively drivingly engaged with the input shaft using a second clutch, the carrier assembly comprising an annular arrangement of the plurality of tiltable variator balls each having ball axle shafts, and configured to be prevented from rotating relative to the housing by a second grounding clutch. The variable transmission may further comprise a second ring assembly rotatably disposed in the housing selectively drivingly engaged with the output shaft using a third clutch or one or more gears of a planetary gearset rotatably disposed on the second ring assembly, the second ring assembly comprising a second variator ball engagement surface that is in driving engagement with each of the variator balls The variable transmission may further comprise a third grounding clutch that engages the one or more gears of the planetary gearset. The variable transmission may further comprise an output shaft comprising a sun gear that is selectively drivingly engaged with the one or more output gears of the planetary gearset using the third grounding clutch. The variable transmission of such configurations may have a forward infinitely variable operating mode, a reverse infinitely variable operating mode, and a continuously variable operating mode, and a continuously variable overdrive operating mode.

In some embodiments, a middle portion of the input shaft is selectively drivingly engaged with the first ring assembly.

In some embodiments, the forward infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the reverse infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the continuously variable operating mode exists when the first clutch is engaged, the second clutch is disengaged, the third clutch is engaged, the first grounding clutch is disengaged, the second grounding clutch is engaged, and the third grounding clutch is disengaged.

In some embodiments, the continuously variable overdrive operating mode exists when the first clutch is engaged, the second clutch is disengaged, the third clutch is disengaged, the first grounding clutch is disengaged, the second grounding clutch is engaged, and the third grounding clutch is engaged.

Provided herein is a variable transmission comprising an input shaft and a differential rotatably disposed in a housing and drivingly engaged with the input shaft, the differential comprising a differential spider and a plurality of bevel gears rotatably disposed thereon. The variable transmission may further comprise a first drive member rotatably disposed about the input shaft and in driving engagement with the differential. The variable transmission may further comprise a first ring assembly rotatably disposed in the housing selectively drivingly engaged with the first drive member using a first clutch, the first ring assembly configured to be prevented from rotating relative to the housing by a first grounding clutch and the first ring assembly comprising a first variator ball engagement surface that is in driving engagement with a plurality of variator balls. The variable transmission may further comprise a carrier assembly rotatably disposed in the housing and selectively drivingly engaged with the first drive member using a second clutch, the carrier assembly comprising an annular arrangement of the plurality of tiltable variator balls each having ball axle shafts, and configured to be prevented from rotating relative to the housing by a second grounding clutch. The variable transmission may further comprise a second ring assembly rotatably disposed in the housing selectively drivingly engaged with the output shaft using a third clutch or one or more gears of a planetary gearset rotatably disposed on the second ring assembly, wherein one or more gears of the planetary gearset are configured to be prevented from rotating relative to the housing using a third grounding clutch, the second ring assembly comprising a second variator ball engagement surface that is in driving engagement with each of the variator balls. The variable transmission may further comprise an output shaft drivingly engaged with the differential and comprising a sun gear that is selectively drivingly engaged with one or more output gears of the planetary gearset using the third grounding clutch. The variable transmission of such configurations may have a forward infinitely variable operating mode, a reverse infinitely variable operating mode, and a continuously variable operating mode, a continuously variable overdrive operating mode, and a direct drive mode.

In some embodiments, the bevel gears apply torque to the first drive member and the output shaft when the input shaft is rotated. In some embodiments, the differential comprises a side gear drivingly engaged with the first drive member, and a second side gear drivingly engaged with the output shaft. In some embodiments, the differential is rotatably supported within the housing. In some embodiments, the differential in driving engagement with the with the first drive member and the output shaft results in a reduction of an overall ratio spread of the variable transmission and reduces an amount of torque applied to the carrier assembly as compared to the embodiment of FIG. 1, for example, or as compared to other embodiments not including a bevel gear, since the bevel gear (alternatively called a bevel differential, or a bevel gear splitter) splits the torque in half through the variator and half directly to the output shaft.

In some embodiments, the first drive member is an annular body. In some embodiments, the first drive member is drivingly engaged with a first side gear of the differential. In some embodiments, a middle portion of the first drive member is selectively drivingly engaged with the carrier assembly. In some embodiments, a second end of the first drive member is selectively drivingly engaged with the first ring assembly.

In some embodiments, the variator balls and the first engagement portion are driven when the input shaft is rotated and the first clutch is engaged.

In some embodiments, the forward infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the reverse infinitely variable operating mode is achievable when the first clutch is disengaged, the second clutch is engaged, the third clutch is engaged, the first grounding clutch is engaged, the second grounding clutch is disengaged, and the third grounding clutch is disengaged.

In some embodiments, the continuously variable operating mode exists when the first clutch is engaged, the second clutch is disengaged, the third clutch is engaged, the first grounding clutch is disengaged, the second grounding clutch is engaged, and the third grounding clutch is disengaged.

In some embodiments, the continuously variable overdrive operating mode exists when the first clutch is engaged, the second clutch is disengaged, the third clutch is disengaged, the first grounding clutch is disengaged, the second grounding clutch is engaged, and the third grounding clutch is engaged.

In some embodiments, the direct drive operating mode exists when the first clutch is engaged, the second clutch is disengaged, the third clutch is disengaged, the first grounding clutch is engaged, the second grounding clutch is disengaged, and the third grounding clutch is disengaged.

In some embodiments, the input shaft and the output shaft are at least partially disposed in the housing.

In some embodiments, the variable transmission comprises an axial force generator configured to generate sufficient axial force to properly operate the vehicle transmission. In some embodiments, the axial force generator comprises one or more clamping mechanisms. In some embodiments, the axial force generator comprises a ball ramp. In some embodiments, the axial force generator comprises a ball ramp thrust ring. In some embodiments, the axial force generator comprises a load applied during assembly of the variable transmission.

In some embodiments, the input shaft is drivingly engaged with a torsional dampener disposed between an engine and the variable transmission.

In some embodiments, the first clutch comprises a wet plate clutch, a dry plate clutch, a cone clutch, or any other clutch type that may be variably engaged. In some embodiments, the second clutch comprises a wet plate clutch, a dry plate clutch, a cone clutch, or any other clutch type that may be variably engaged. In some embodiments, the third clutch comprises a wet plate clutch, a dry plate clutch, a cone clutch, or any other clutch type that may be variably engaged.

In some embodiments, each of the ball axle shafts is adjusted using a cam style tilting mechanism. In some embodiments, each of the ball axle shafts is adjusted using a split carrier axle skewing mechanism.

In some embodiments, the first ring assembly comprises a first clutch engagement portion. In some embodiments, the first clutch engagement portion extends inwardly from an inner surface of the first ring assembly.

In some embodiments, the second ring assembly comprises a third clutch engagement portion. In some embodiments, the third clutch engagement portion extends inwardly from an inner surface of the second ring assembly.

In some embodiments, the first variator ball engagement surface is formed in a distal end of the first ring assembly. In some embodiments, the first variator ball engagement surface is formed in an input ring of the first ring assembly. In some embodiments, the first variator ball engagement surface is a conical surface or a concave toroidal surface in contact with or slightly spaced apart from each of the variator balls.

In some embodiments, the second variator ball engagement surface is a conical surface or a concave toroidal surface in contact with or slightly spaced apart from each of the variator balls. In some embodiments, the first variator ball engagement surface is in driving engagement with each of the variator balls of the carrier assembly through one of a boundary layer type friction and an elastohydrodynamic film. In some embodiments, the second variator ball engagement surface is in driving engagement with each of the variator balls of the first carrier assembly through one of a boundary layer type friction and an elastohydrodynamic film.

In some embodiments, the planetary gearset comprises a plurality of planet output gears. In some embodiments, the third grounding clutch is at least partially disposed on an inner surface of the housing. In some embodiments, the planetary gearset comprises a ring gear comprising a third grounding clutch engagement portion. In some embodiments, the third grounding clutch engagement portion extends outwardly from an outer surface of the ring gear. In some embodiments, the third grounding clutch engagement portion makes up a portion of the third grounding clutch. In some embodiments, the third grounding clutch is selectively variably engaged to fix the ring gear to the housing. In some embodiments, the ring gear is in driving engagement with at least one planet output gear. In some embodiments, the ring gear is in driving engagement with a plurality of planet output gears. In some embodiments, the ring gear is in driving engagement with a plurality of planet output gears. In some embodiments, engaging the third grounding clutch changes an output ratio between the second ring assembly and the output shaft.

In some embodiments, the output shaft is drivingly engaged with a vehicle output.

In some embodiments, a middle portion of the output shaft is selectively drivingly engaged with the second ring assembly using the third clutch. In some embodiments, the third grounding clutch is configured to change an output ratio between the second ring assembly and the output shaft when said third grounding clutch is engaged.

In some embodiments, a mode of the transmission depends on the engagement status of the first clutch, the second clutch, the third clutch, the first grounding clutch, the second grounding clutch, and the third grounding clutch.

Provided herein is a vehicle driveline comprising the variable transmission of any type or configuration described herein, wherein said variable transmission is disposed between an engine and a vehicle output. In some embodiments, the vehicle output comprises a differential and a drive axle. In some embodiments, the vehicle driveline comprises a torsional dampener disposed between the engine and the variable transmission. In some embodiments, the torsional dampener comprises at least one torsional spring.

Provided herein is a method of changing from between a continuously variable transmission mode, a continuously variable overdrive transmission mode, and an infinitely variable transmission mode (forward or reverse), comprising engaging or disengaging a first clutch, second clutch, third clutch, first grounding clutch, second grounding clutch, and third grounding clutch of any of variable transmission as described herein without a bevel gear differential therein according to the table in FIG. 2.

A method of changing from between a continuously variable transmission mode, a continuously overdrive transmission mode, a direct drive transmission mode, and an infinitely variable transmission mode (forward or reverse), comprising engaging or disengaging a first clutch, second clutch, third clutch, first grounding clutch, second grounding clutch, and third grounding clutch of any of variable transmission as described herein including a bevel gear differential therein according to the table in FIG. 4.

Thus, a first configuration of a vehicle driveline including a variable transmission 2 according to an embodiment of the invention is shown in FIG. 1. The variable transmission 2 includes an input shaft 20, a carrier assembly, a first ring assembly, a second ring assembly, and an output shaft 22. The input shaft 20 and the output shaft 22 are at least partially disposed in a housing (not shown). The carrier assembly, the first ring assembly, and the second ring assembly are rotatably disposed in the housing. The second ring assembly includes a portion of a planetary gearset.

Ball ramps, indicated in FIG. 1 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission; however, it is understood that the amount of axial force necessary for proper operation may be generated by a clamping mechanism (not shown) or as a load applied during assembling of the variable transmission.

The input shaft 20 has a first end drivingly engaged with the torsional dampener 16, a middle portion which may be selectively drivingly engaged with the first ring assembly, and a second end which may be selectively drivingly engaged with the carrier assembly. The middle portion may be selectively drivingly engaged with the first ring assembly using a first clutch 8. The first clutch 8 may be a wet plate clutch, a dry plate clutch, a cone clutch, or any other clutch type that may be variably engaged. The second end of the input shaft 20 may be selectively drivingly engaged with the carrier assembly using a second clutch 10. The second clutch 10 may be a wet plate clutch, a dry plate clutch, a cone clutch, or any other clutch type that may be variably engaged.

The carrier assembly is rotatably disposed in the housing and includes a plurality of ball axle shafts 14a, 14b tiltably disposed therein in an annular arrangement. Each of the ball axle shafts 14a, 14b may be adjusted using one of a cam style tilting mechanism and a split carrier axle skewing mechanism 15. Each of the ball axle shafts 14a, 14b includes a variator ball 18a, 18b rotatably disposed thereon. A variator idler 26 sits between the variator balls 18a,18b. A second grounding clutch 30 (alternatively considered or called a second brake to ground or second brake) at least partially disposed on an inner surface of the housing may be selectively variably engaged to militate against a relative rotation from occurring between the carrier assembly and the housing.

The first ring assembly is an annular member rotatably disposed in the housing. As mentioned hereinabove, the first ring assembly may be selectively drivingly engaged with the input shaft 20 using the first clutch 8. The first ring assembly includes a first clutch engagement portion 34 extending inwardly from an inner surface of the first ring assembly. The first ring assembly includes a first grounding clutch engagement portion 36 extending outwardly from an outer surface of the first ring assembly. A first grounding clutch 28 (alternatively considered or called a first brake to ground or first brake) at least partially disposed on an inner surface of the housing may be selectively variably engaged to militate against a relative rotation from occurring between the first ring assembly and the housing. A first variator ball engagement surface 38 is formed in a distal end of the first ring assembly. The first variator ball engagement surface 38 may be a conical surface or a concave toroidal surface in contact with or slightly spaced apart from each of the variator balls 18a, 18b. The first variator ball engagement surface 38 is in driving engagement with each of the variator balls 18a, 18b through one of a boundary layer type friction and an elastohydrodynamic film.

The second ring assembly is an annular member rotatably disposed in the housing. The second ring assembly may be selectively drivingly engaged with the output shaft 22 using the third clutch 12 or through a plurality of planet output gears rotatably disposed on the second ring assembly. The second ring assembly includes a third clutch engagement portion 40 extending inwardly from an inner surface of the second ring assembly. A ring gear 42 of the planetary gearset includes a third grounding clutch engagement portion 44 extending outwardly from an outer surface thereof. A third grounding clutch 46 (alternatively considered or called a third brake to ground or third brake) at least partially disposed on an inner surface of the housing may be selectively variably engaged to fix the ring gear 42a to the housing. The ring gear 42a is in driving engagement with each of the planet output gears 48a. The third grounding clutch 46 may be engaged to change an output ratio between the second ring assembly and the output shaft 22.

A second variator ball engagement surface 52 is formed in a distal end of the second ring assembly. The second variator ball engagement surface 52 may be a conical surface or a concave toroidal surface in contact with or slightly spaced apart from each of the variator balls 18a, 18b. The second variator ball engagement surface 52 is in driving engagement with each of the variator balls 18a, 18b through one of a boundary layer type friction and an elastohydrodynamic film.

The output shaft 22 has a first end drivingly engaged with the vehicle output 6, a middle portion which may be selectively drivingly engaged with the second ring assembly, and a second end. The middle portion may be selectively drivingly engaged with the second ring assembly using the third clutch 12. The third clutch 12 may be a wet plate clutch, a dry plate clutch, a cone clutch, or any other clutch type that may be variably engaged. The second end forms a sun gear 50 which may be selectively drivingly engaged with each of the planet output gears 48a, 48b, as mentioned hereinabove, using the third grounding clutch 46.

The variable transmission 2 as shown in FIG. 1 may be operated in at least four different operating modes, shown in FIG. 2, depending on an engagement status of the first clutch 8, the second clutch 10, the third clutch 12, the first grounding clutch 28 (alternatively considered or called a first brake to ground or first brake), the second grounding clutch 30 (alternatively considered or called a second brake to ground or second brake), and the third grounding clutch 46 (alternatively considered or called a third brake to ground or third brake). The variable transmission 2 may be operated in a continuously variable operating mode. Further, the continuously variable operating mode may be a continuously variable operating overdrive mode. The variable transmission may be operated in a forward infinitely variable operating mode or a reverse infinitely variable operating mode.

FIG. 2 describes the engagement status of each of the first clutch 8, the second clutch 10, the third clutch 12, the first grounding clutch 28 (alternatively considered or called a first brake to ground or first brake), the second grounding clutch 30 (alternatively considered or called a second brake to ground or second brake), and the third grounding clutch 46 (alternatively considered or called a third brake to ground or third brake) in order to operate the variable transmission 2 of FIG. 1 in the continuously variable operating mode, the continuously variable overdrive operating mode, the forward infinitely variable operating mode, and the reverse infinitely variable operating mode.

As FIG. 2 indicates, in order to run the variable transmission 2 of FIG. 1 in a continuously variable overdrive operating mode, the first clutch 8 is engaged, the second clutch 10 is disengaged, the third clutch 12 is disengaged, the first grounding clutch 28 is disengaged, the second grounding clutch 30 is engaged, and the third grounding clutch 46 is engaged. In order to run the variable transmission 2 of FIG. 1 in a continuously variable operating mode, the first clutch 8 is engaged, the second clutch 10 is disengaged, the third clutch 12 is engaged, the first grounding clutch 28 is disengaged, the second grounding clutch 30 is engaged, and the third grounding clutch 46 is disengaged.

In order to run the variable transmission 2 of FIG. 1 in a forward infinitely variable operating mode, the first clutch 8 is disengaged, the second clutch 10 is engaged, the third clutch 12 is engaged, the first grounding clutch 28 is engaged, the second grounding clutch 30 is disengaged, and the third grounding clutch 46 is disengaged. In order to run the variable transmission 2 of FIG. 1 in a reverse infinitely variable operating mode, the first clutch 8 is disengaged, the second clutch 10 is engaged, the third clutch 12 is engaged, the first grounding clutch 28 is engaged, the second grounding clutch 30 is disengaged, and the third grounding clutch 46 is disengaged. Note that in the infinitely variable operating modes, regardless of whether the direction of motion is forward or reverse, the same configuration of engagement or disengagement exists for all of the clutches and grounding clutches.

Figure 3:
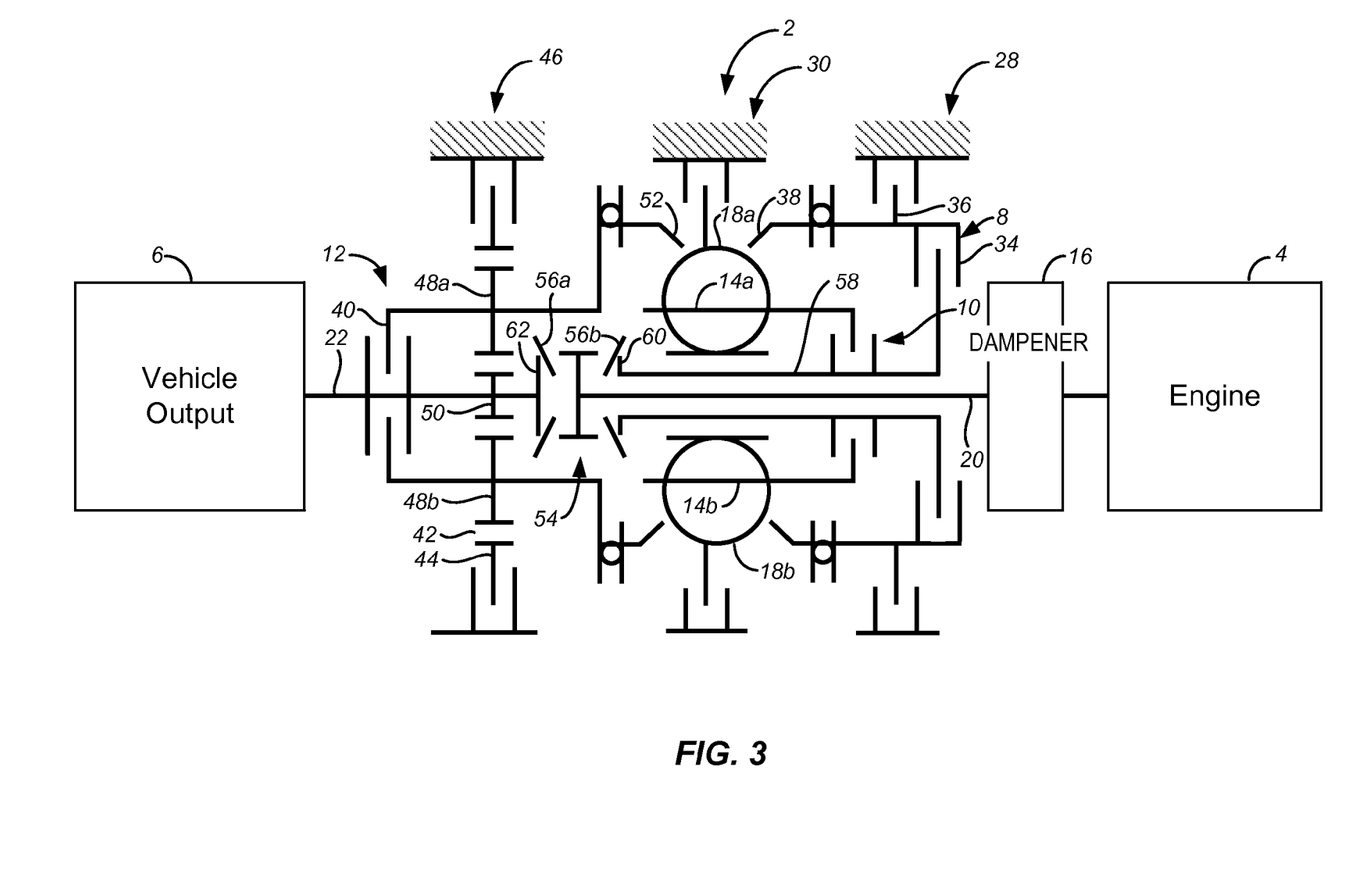
FIG. 3 depicts an embodiment of a variable transmission located between an engine and a vehicle output.

A second configuration of the variable transmission 2 is shown in FIG. 3. The variable transmission 2 is located between an engine 4 and a vehicle output 6 as shown in FIG. 3. The vehicle output 6 may be a drive shaft or a differential, for example. A torsional dampener 16 is also typically disposed between the engine 4 and the variable transmission 2 to reduce vibration and torque peaks.

The second configuration of a vehicle driveline including a variable transmission 2 according to an embodiment of the invention is shown in FIG. 3. The variable transmission 2 includes an input shaft 20, a differential 54, a first drive member 58, a carrier assembly, a first ring assembly, a second ring assembly, and an output shaft 22. The input shaft 20 and the output shaft 22 are at least partially disposed in a housing (not shown). The differential 54, the carrier assembly, the first ring assembly, and the second ring assembly are rotatably disposed in the housing. The second ring assembly includes a portion of a planetary gearset.

Ball ramps, indicated in FIG. 3 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission; however, it is understood that the amount of axial force necessary for proper operation may be generated by a clamping mechanism (not shown) or as a load applied during assembling of the variable transmission.

FIG. 1 is similar to FIG. 3, however, FIG. 3 comprises a bevel gear differential. In both embodiments, the configurations provided expand the ratio range and increase the power capacity of the variator for commercial vehicle applications as compared to other known variable transmissions (e.g. variable transmissions for lighter vehicle applications). The three clutches and three brakes (called grounding clutches herein) allow a single variator to function as an infinitely variable transmission when power is inputted to the carrier assembly and as a continuously variable transmission when power is inputted through the first ring assembly (which may also and/or alternatively be called an input ring). The addition of the bevel gear differential in FIG. 3 allows a parallel power path around the variator to improve the variator torque capacity. The embodiment of FIG. 3 also has a direct drive mode to improve the efficiency of the variator.

Thus, the input shaft 20 of FIG. 3 has a first end drivingly engaged with the torsional dampener 16 and a second end drivingly engaged with a differential spider of the differential 54. A plurality of bevel gears 56a, 56b rotatably disposed on the differential spider applies torque to the first drive member 58 and the output shaft 22 when the input shaft 20 is rotated.

The differential 54 includes the differential spider having bevel gears 56a, 56b rotatably disposed thereon, a first side gear 60 drivingly engaged with the first drive member 58, and a second side gear 62 drivingly engaged with the output shaft 22. The differential 54 is rotatably supported within the housing. The differential 54 in driving engagement with the first drive member 58 and the output shaft 22 results in a reduction of an overall ratio spread of the variable transmission 2 and reduces an amount of torque applied to the carrier assembly as compared to the embodiment of FIG. 1, for example, or as compared to other embodiments not including a bevel gear, since the bevel gear (alternatively called a bevel differential, or a bevel gear splitter) splits the torque in half through the variator and half directly to the output shaft.

The first drive member 58 is an annular body rotatably disposed about the input shaft 20. A first end of the first drive member 58 is drivingly engaged with the first side gear 60 of the differential 54. A middle portion of the first drive member 58 may be selectively drivingly engaged with the carrier assembly. The middle portion of the first drive member 58 may be selectively drivingly engaged with the carrier assembly using a second clutch 10. The second clutch 10 may be a wet plate clutch, a dry plate clutch, a cone clutch, or any other clutch type that may be variably engaged. A second end of the first drive member 58 may be selectively drivingly engaged with the first ring assembly. The second end of the first drive member 58 may be selectively drivingly engaged with the first ring assembly using a first clutch 8. The first clutch 8 may be a wet plate clutch, a dry plate clutch, a cone clutch, or any other clutch type that may be variably engaged.

The carrier assembly is rotatably disposed in the housing and includes a plurality of ball axle shafts 14a, 14b, tiltably disposed therein in an annular arrangement. Each of the ball axle shafts 14a, 14b may be adjusted using one of a cam style tilting mechanism and a split carrier axle skewing mechanism. Each of the ball axle shafts 14a, 14b includes a variator ball 18a, 18b rotatably disposed thereon. A second grounding clutch 30 at least partially disposed on an inner surface of the housing may be selectively variably engaged to militate against a relative rotation from occurring between the carrier assembly and the housing.

The first ring assembly is an annular member rotatably disposed in the housing. As mentioned hereinabove, the first ring assembly may be selectively drivingly engaged with the first drive member 58 using the first clutch 8. The first ring assembly includes a first clutch engagement portion 34 extending inwardly from an inner surface of the first ring assembly. The first ring assembly includes a first grounding clutch engagement portion 36 extending outwardly from an outer surface of the first ring assembly. A first grounding clutch 28 at least partially disposed on an inner surface of the housing may be selectively variably engaged to militate against a relative rotation from occurring between the first ring assembly and the housing. A first variator ball engagement surface 38 is formed in a distal end of the first ring assembly. The first variator ball engagement surface 38 may be a conical surface or a concave toroidal surface in contact with or slightly spaced apart from each of the variator balls 18a, 18b. The first variator ball engagement surface 38 is in driving engagement with each of the variator balls 18a, 18b through one of a boundary layer type friction and an elastohydrodynamic film.

The second ring assembly is an annular member rotatably disposed in the housing. The second ring assembly may be selectively drivingly engaged with the output shaft 22 using the third clutch 12 or through a plurality of planet output gears rotatably disposed on the second ring assembly. The second ring assembly includes a third clutch engagement portion 40 extending inwardly from an inner surface of the second ring assembly. A ring gear 42 of the planetary gearset includes an third grounding clutch engagement portion 44 extending outwardly from an outer surface thereof. A third grounding clutch 46 at least partially disposed on an inner surface of the housing may be selectively variably engaged to fix a ring gear 42 to the housing. The ring gear 42 is in driving engagement with each of the planet output gears 48a, 48b. The third grounding clutch 46 may be engaged to change an output ratio between the second ring assembly and the output shaft 22. A second variator ball engagement surface 52 is formed in a distal end of the second ring assembly. The second variator ball engagement surface 52 may be a conical surface or a concave toroidal surface in contact with or slightly spaced apart from each of the variator balls 18a, 19b. The second variator ball engagement surface 52 is in driving engagement with each of the variator balls 18a, 18b through one of a boundary layer type friction and an elastohydrodynamic film.

The output shaft 22 has a first end drivingly engaged with the vehicle output 6, a middle portion which may be selectively drivingly engaged with the second ring assembly, and a second end. The middle portion of the output shaft 22 may be selectively drivingly engaged with the second ring assembly using the third clutch 12. The third clutch 12 may be a wet plate clutch, a dry plate clutch, a cone clutch, or any other clutch type that may be variably engaged. The second end includes a sun gear 50 formed thereon which may be selectively drivingly engaged with each of the planet output gears 48a, 48b, as mentioned hereinabove, using the third grounding clutch 46. The second end of the output shaft 22 is also drivingly engaged with the second side gear 62.

The variable transmission 2 as shown in FIG. 3 may be operated in at least five different operating modes, shown in FIG. 4, depending on an engagement status of the first clutch 8, the second clutch 10, the third clutch 12, the first grounding clutch 28 (alternatively considered or called a first brake to ground or first brake), the second grounding clutch 30 (alternatively considered or called a second brake to ground or second brake), and the third grounding clutch 46 (alternatively considered or called a third brake to ground or third brake). The variable transmission may be operated in the continuously variable operating mode. Further, the continuously variable operating mode may be a continuously variable operating overdrive mode. The variable transmission may be operated in a forward infinitely variable operating mode or a reverse infinitely variable operating mode. Further, variable transmission may be operated in a direct drive mode.

As compared to FIG. 1, the transmission 2 of FIG. 3 allows for a direct drive mode. In the direct drive mode, the first clutch 8 and the first grounding clutch 28 are engaged, preventing rotation of the first drive member 58 and thus the first side gear 60. In response, the output shaft 22 is driven directly by the input shaft 20 through the bevel gears 56a, 56b of the differential 54.

FIG. 4 describes the engagement status of each of the first clutch 8, the second clutch 10, the third clutch 12, the first grounding clutch 28 (alternatively considered or called a first brake to ground or first brake), the second grounding clutch 30 (alternatively considered or called a second brake to ground or second brake), and the third grounding clutch 46 (alternatively considered or called a third brake to ground or third brake) in order to operate the variable transmission shown in FIG. 3 in the continuously variable operating mode, the continuously variable overdrive operating mode, the forward infinitely variable operating mode, the reverse infinitely variable operating mode, and the direct drive mode.

As FIG. 4 indicates, in order to run the variable transmission 2 of FIG. 3 in a continuously variable overdrive operating mode, the first clutch 8 is engaged, the second clutch 10 is disengaged, the third clutch 12 is disengaged, the first grounding clutch 28 is disengaged, the second grounding clutch 30 is engaged, and the third grounding clutch 46 is engaged. In order to run the variable transmission 2 of FIG. 3 in a continuously variable operating mode, the first clutch 8 is engaged, the second clutch 10 is disengaged, the third clutch 12 is engaged, the first grounding clutch 28 is disengaged, the second grounding clutch 30 is engaged, and the third grounding clutch 46 is disengaged. In order to run the variable transmission 2 of FIG. 3 in a forward infinitely variable operating mode, the first clutch 8 is disengaged, the second clutch 10 is engaged, the third clutch 12 is engaged, the first grounding clutch 28 is engaged, the second grounding clutch 30 is disengaged, and the third grounding clutch 46 is disengaged. In order to run the variable transmission 2 of FIG. 3 in a reverse infinitely variable operating mode, the first clutch 8 is disengaged, the second clutch 10 is engaged, the third clutch 12 is engaged, the first grounding clutch 28 is engaged, the second grounding clutch 30 is disengaged, and the third grounding clutch 46 is disengaged. Note that in the infinitely variable operating modes, regardless of whether the direction of motion is forward or reverse, the same configuration of engagement or disengagement exists for all of the clutches and grounding clutches. As shown in FIG. 4 and described above, in order to run the variable transmission 2 of FIG. 3 in a direct drive mode, the first clutch 8 is engaged, the second clutch 10 is disengaged, the third clutch 12 is disengaged, the first grounding clutch 28 is engaged, the second grounding clutch 30 is disengaged, and the third grounding clutch 46 is disengaged.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

Embodiments of the variable transmission described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet ski's, personal watercraft vehicles, airplanes, trains, helicopters, buses, forklifts, golf carts, motorships, steam powered ships, submarines, space craft, or other vehicles that employ a transmission.

It is to be understood that the invention may assume various alternative orientations and step sequences, except where expressly specified to the contrary. It is also to be understood that the specific devices and processes illustrated in the attached drawings, and described in the specification herein are simply exemplary embodiments of the inventive concepts defined herein. Hence, specific dimensions, directions or other physical characteristics relating to the embodiments disclosed are not to be considered as limiting, unless expressly stated otherwise.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission comprising:
   an input shaft;
   a first ring assembly rotatably disposed in a housing selectively drivingly engaged with the input shaft using a first clutch, the first ring assembly configured to be prevented from rotating relative to the housing by a first grounding clutch and the first ring assembly comprising a first variator ball engagement surface that is in driving engagement with a plurality of tiltable variator balls;
   a carrier assembly rotatably disposed in the housing and selectively drivingly engaged with the input shaft using a second clutch, the carrier assembly comprising an annular arrangement of the plurality of tiltable variator balls each having a ball axle shafts, and configured to be prevented from rotating relative to the housing by a second grounding clutch;
   a second ring assembly rotatably disposed in the housing selectively drivingly engaged with an output shaft using a third clutch or gears of a planetary gearset rotatably disposed on the second ring assembly, the second ring assembly comprising a second variator ball engagement surface that is in driving engagement with each of the variator balls;
   a third grounding clutch that engages the ring gear of the planetary gearset; and
   the output shaft selectively drivingly engaged to a sun gear and a plurality of planet output gears of the planetary gearset using the third grounding clutch,
   wherein said transmission has a forward infinitely variable operating mode, a reverse infinitely variable operating mode, a continuously variable operating mode, and a continuously variable overdrive operating mode.

2. The variable transmission of claim 1, wherein a middle portion of the input shaft is selectively drivingly engaged with the first ring assembly.

3. The variable transmission of claim 1, wherein the forward infinitely variable operating mode is achievable when the first clutch is disengaged, the second clutch is engaged, the third clutch is engaged, the first grounding clutch is engaged, the second grounding clutch is disengaged, and the third grounding clutch is disengaged.

4. The variable transmission of claim 1, wherein the reverse infinitely variable operating mode is achievable when the first clutch is disengaged, the second clutch is engaged, the third clutch is engaged, the first grounding clutch is engaged, the second grounding clutch is disengaged, and the third grounding clutch is disengaged.

5. The variable transmission of claim 1, wherein the continuously variable operating mode exists when the first clutch is engaged, the second clutch is disengaged, the third clutch is engaged, the first grounding clutch is disengaged, the second grounding clutch is engaged, and the third grounding clutch is disengaged.

6. The variable transmission of claim 1, wherein the continuously variable overdrive operating mode exists when the first clutch is engaged, the second clutch is disengaged, the third clutch is disengaged, the first grounding clutch is disengaged, the second grounding clutch is engaged, and the third grounding clutch is engaged.

7. The variable transmission of claim 1, wherein the input shaft and the output shaft are at least partially disposed in the housing.

8. The vehicle transmission of claim 1, comprising an axial force generator configured to generate sufficient axial force to properly operate the vehicle transmission.

9. The vehicle transmission of claim 8, wherein the axial force generator comprises one or more clamping mechanisms.

10. The vehicle transmission of claim 8, wherein the axial force generator comprises a ball ramp.

11. The vehicle transmission of claim 8, wherein the axial force generator comprises a ball ramp thrust ring.

12. The vehicle transmission of claim 8, wherein the axial force generator comprises a load applied during assembly of the variable transmission.

13. The variable transmission of claim 1, wherein the first clutch comprises a wet plate clutch, a dry plate clutch, a cone clutch, or any other clutch type that may be variably engaged.

14. The variable transmission of claim 1, wherein the second clutch comprises a wet plate clutch, a dry plate clutch, a cone clutch, or any other clutch type that may be variably engaged.

15. The variable transmission of claim 1, wherein the third clutch comprises a wet plate clutch, a dry plate clutch, a cone clutch, or any other clutch type that may be variably engaged.

16. The variable transmission of claim 1, wherein each of the ball axle shafts is adjusted using a split carrier axle skewing mechanism.

17. The variable transmission of claim 1, wherein the first ring assembly comprises a first clutch engagement portion.

18. The variable transmission of claim 17, wherein the first clutch engagement portion extends inwardly from an inner surface of the first ring assembly.

19. The variable transmission of claim 1, wherein the second ring assembly comprises a third clutch engagement portion.

20. The variable transmission of claim 19, wherein the third clutch engagement portion extends inwardly from an inner surface of the second ring assembly.

* * * * *